Nov. 10, 1936.  C. ELLIS, JR  2,060,560
ILLUMINATED IMAGE PROJECTOR WITH INTERMITTENT
BURNING LAMP AND NATURAL DRAFT LAMP COOLING
Filed March 27, 1933   4 Sheets-Sheet 1
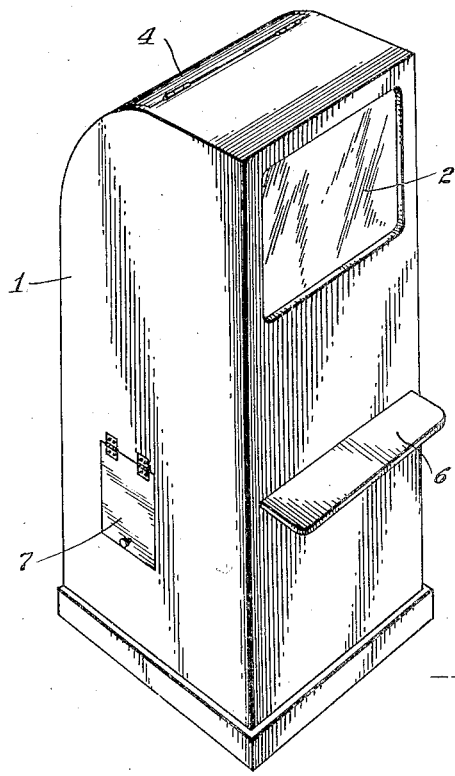
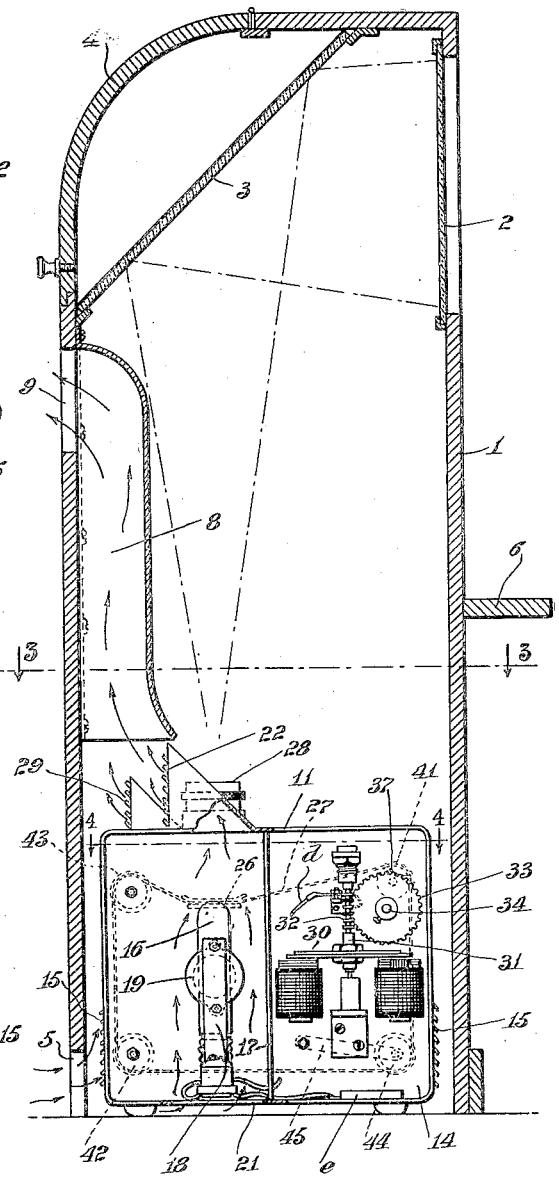

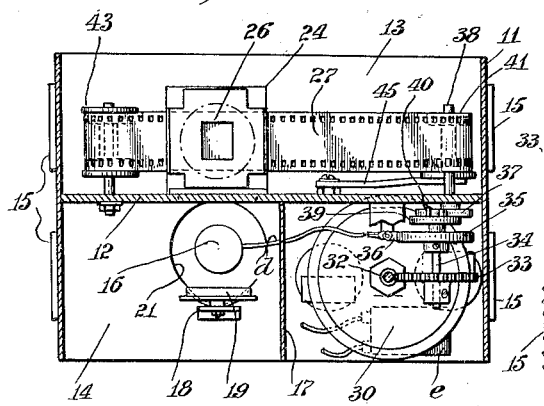
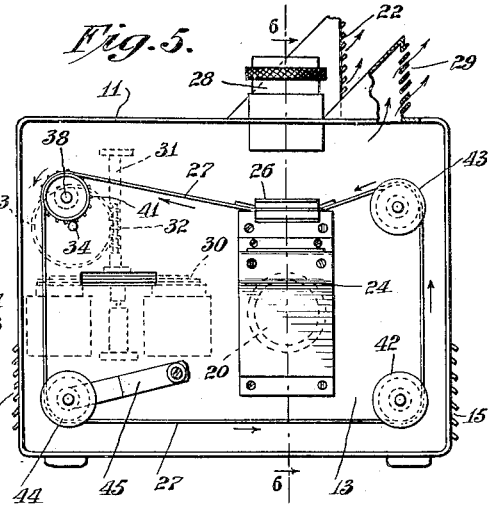
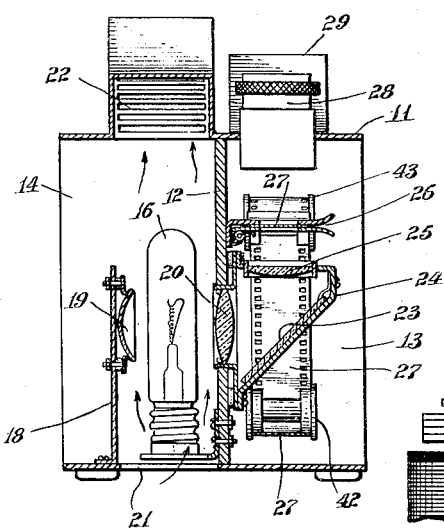
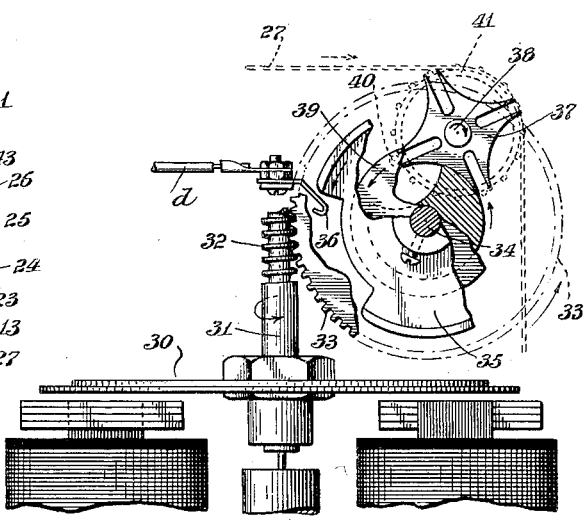

Nov. 10, 1936.　　　C. ELLIS. JR　　　2,060,560
ILLUMINATED IMAGE PROJECTOR WITH INTERMITTENT
BURNING LAMP AND NATURAL DRAFT LAMP COOLING
Filed March 27, 1933　　　4 Sheets-Sheet 4

Carlton Ellis Jr
INVENTOR

Patented Nov. 10, 1936

2,060,560

UNITED STATES PATENT OFFICE 2,060,560

ILLUMINATED-IMAGE PROJECTOR WITH INTERMITTENT BURNING LAMP AND NATURAL DRAFT LAMP COOLING

Carleton Ellis, Jr., Montclair, N. J.

Application March 27, 1933, Serial No. 662,938

3 Claims. (Cl. 88—24)

This invention relates to image-projecting units or devices comprising a means or source of illumination and a continuous band of image-bearing film or transparency adapted for projection as an enlarged image on a suitable screen; such image-projecting device being intended for various uses such as for amusement purposes and/or as an advertising means.

For the purpose of providing a unit with suitable transparencies I preferably use photographic film which may be like that of ordinary moving picture film and which may carry photographs, drawings, legends, and the like, as may be required, all preferably arranged as frames to correspond to normal moving picture film requirements. The film preferably is continuous, that is, it is endless, being made in the form of a loop with the ends fastened together in order that such a sequence of images may pass in intermittent manner before the source of illumination and the images thus be projected on a suitable screen.

Since films available for the purpose are generally affected by heat I aim to secure a minimum of deterioration of such film by cooling means, which may be accomplished in several ways.

Another consideration is the life of the lamp employed, this being generally of the electric bulb type and therefore likely to deteriorate rapidly if overheated. On the other hand it is necessary from a comparatively small electric bulb to secure a maximum of light to provide strong illumination. In the present invention the preferred modification is that of burning the light only during the period that the image is thrown on the screen and to provide an interval of rest for the filament while the image on the following frame is moving into position. During this period of rest the light is automatically extinguished by cutting off the electric current. Means are provided for natural draft ventilation, preferably augmented by a stack or other arrangement which permits of a column of hot air to rise by convection and draw cool air in and through the lamp chamber. The joint effect of intermittent lighting and natural draft ventilation prevents the housing containing the projecting means from becoming overheated to an extent such that film and the filament of the lamp are heated to an undue degree.

By carrying out my invention in this respect I have found that an electric bulb which ordinarily would burn perhaps 50 to 60 hours before collapse of the filament can now be burned for several hundred hours without such destruction taking place. Likewise films commonly made of nitrocellulose (celluloid) and therefore quite susceptible to deterioration by heat can be used for an indefinite period without becoming unduly brittle and cracking or breaking.

In some cases I may augment the natural draft by the introduction of forced draft, induced draft, or other mechanical draft system as an auxiliary, but ordinarily I do not employ mechanical means for producing draft but use simple convection, preferably with the projector installed in a housing having ample height to secure such rapid ventilation by natural draft force. Moving parts in an apparatus of this kind are objectionable both from the standpoint of liability to get out of order and because of noise which may be produced thereby. A feature of the invention which is important from the standpoint of noiselessness of operation is that of employment of an induction motor which, unlike electric motors of the usual commutator type, operates in perfect silence.

A construction of the type indicated therefore permits the apparatus to be placed on the counter of a shop or in a display window operating silently and projecting successively images of any special advertising character as may be desired.

The three features, therefore, which are outstanding in the present invention are as follows:

1. Noiseless or substantially noiseless operation.
2. Intermittent operation of an incandescent electric light with simultaneous cooling, permitting protracted service of said light.
3. Pronounced natural draft cooling maintaining temperature of the projection apparatus below that at which the image-bearing film would deteriorate too rapidly.

Reference is made to the accompanying drawings which serve to illustrate the present invention.

In the drawings Figure 1 is a perspective view of a casing or housing containing in its lower part the projection unit and in its upper part an image-receiving screen; a vertical section of this self-contained apparatus being shown in Figure 2.

Figure 3 is a cross section along the line 3—3 of Figure 2.

Figure 4 is a section on the line 4—4 of Fig. 2 of the operating mechanism showing a slotted band of film in position, vertical details thereof being shown in Figure 5. The latter also depicts a part of the ventilating and cooling system.

A section along the line 6—6 of Figure 5 constitutes Figure 6 and shows a lamp which may be to the left of the film chamber and also shows a part of the cooling system.

Figure 7 provides details of a noiseless electric induction motor with worm and gear connections.

Figure 8:
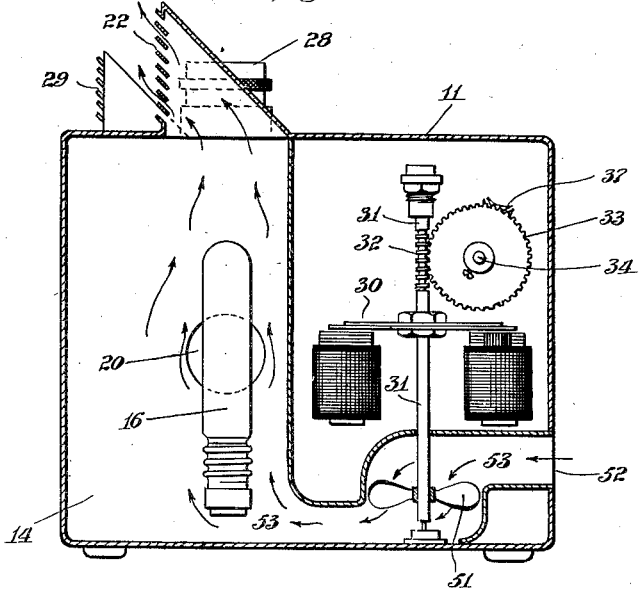

Figure 8 designates a modified form of the projection unit showing a fan or propeller for creating a forced draft ventilation when extremely powerful lighting means result in the evolution of more than the normal excess of heat.

Figure 9:
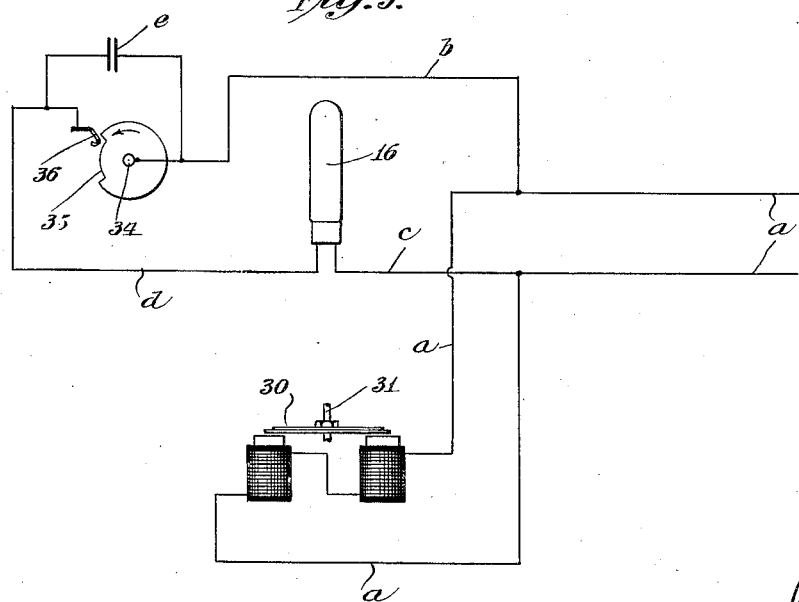

Figure 9 is a diagram exhibiting electrical connections.

Figure 10:
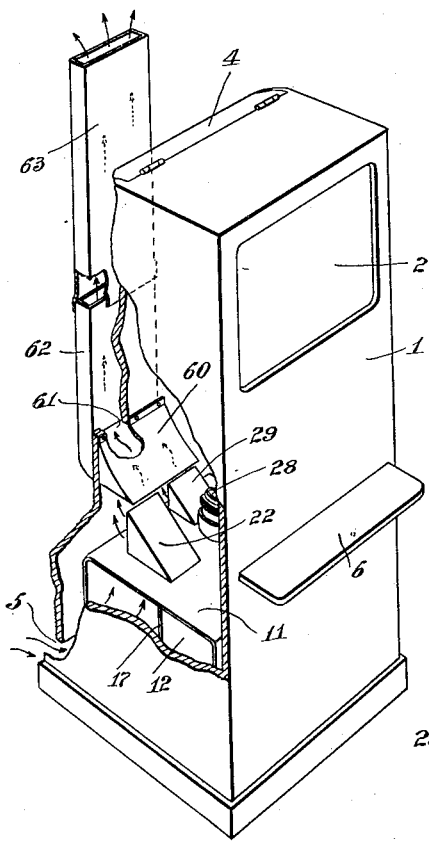

Figure 10 is modified form of external stack.

Figure 11:
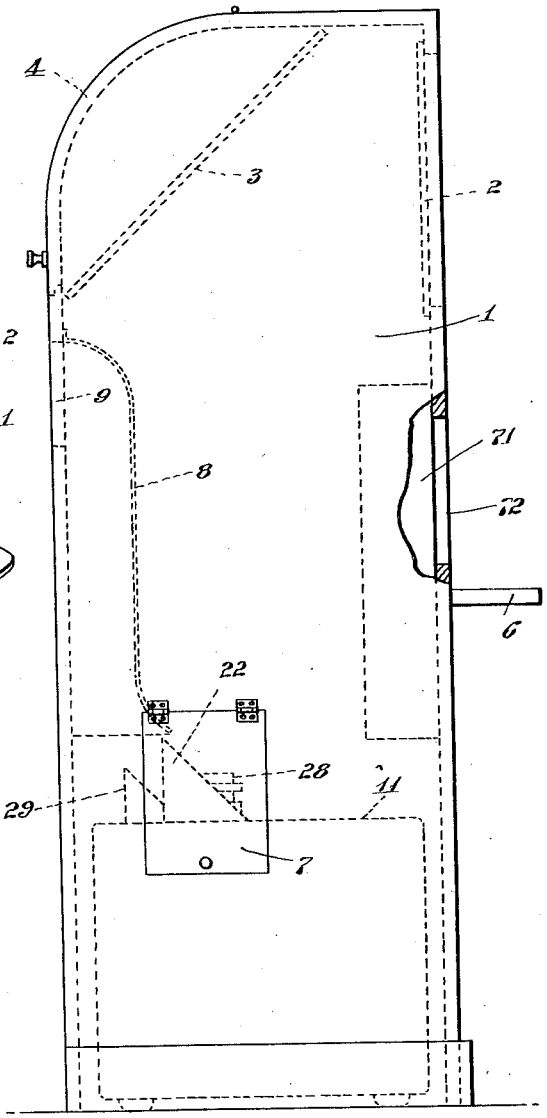

Figure 11 depicts partly in section and partly in vertical elevation a housing carrying auxiliary sound reproducing apparatus in order that talking effects may be secured coincident with the appearance on the screen of a given image.

In the drawings:

1 is an outer housing, 2 is a ground glass window upon which images are projected, 6 is a display shelf, 7 is a door through which the projection lenses are focused, 4 is a door giving access to reflecting mirror 3, 5 and 9 are ventilator openings, 8 is a ventilator flue.

The ventilated housing 11 contains the vertical or upright support termed the chassis 12 of asbestos board or other heat and electrical insulating material, upon which is mounted the operating mechanism. 30 is an induction motor, 32 is a worm, 34 a shaft upon which worm gear 33, current interrupter 35 and gear 39, securing intermittent operation of gear 37, are mounted.

40 is a pin, being part of gear 39, operating gear 37. 38 is a shaft on which gear 37 and film sprocket 41 are mounted. 36 is an electrical contact brush.

27 is a photographic transparency in the form of a continuous belt, or film. 42 and 43 are rollers and 44 is an idler roller on swinging arm 45 and arranged to create a suitable tension of the film 27.

16 is the projector lamp separated from motor compartment by upright partition 17. 19 is a concave reflector, 23 a 45° reflecting mirror or prism, 20 and 25 are condenser lenses, 26 a film gate, and 28 a projection lens. 22 is a ventilator for lamp housing. 29 is a ventilator for the film compartment.

In Figure 10, 60 is a hood to conduct warm air through outlet 61 into stack 62; 63 is a removable stack extension.

In Figure 11, 71 is a talking reproducing unit and 72 an opening for emission of sound waves.

The method of operation is as follows. When the current is turned "on", the induction motor 30 rotates worm 32 which operates worm gear 33 and this in turn rotates shaft 34. Therefore, current interrupter 35 rotates securing make and break contact with brush 36. Wire d conducts current intermittently from current interrupter 35 to projection lamp 16.

Rotation of shaft 34 also causes gear 39 to rotate operating in turn gear 37. So that with each revolution of worm gear 33 pin 40 engages gear 37 and causes it to make a quarter revolution which motion is imparted through shaft 38 to sprocket 41. As movement of film 27 is controlled by sprocket 41 each quarter revolution of sprocket 41 causes film 27 to move the predetermined distance of one frame in gate 26. Current interrupter 35 is adjusted so that it will not make contact with brush 36 during the interval that pin 40 is engaged with gear 37. However, as soon as and during the period that pin 40 is disengaged from gear 37 commutator 35 and brush 36 make contact.

Hence during the interval that the film is moving the distance of one frame the lamp is "out" and during the period that the film remains motionless the lamp is "on." Thus there is no movement of the film while the lamp is "on."

Particular attention is directed to the intermittent manner in which the projector lamp is operated and to the unusual location and construction of the lamp housing. It will be noted that the lamp is "out" during the interval that the film is moving into its next position. This novel method of operating the lamp lengthens its life five or six times and also enables it to be operated at a higher voltage than that at which it should normally be used, resulting in the unique combination of very high efficiency and extremely long life.

Tests were carried out on several ordinary good quality projector bulbs which were guaranteed for 50 hours. Under continuous running their life was from 50 to 70 hours.

However, these same type bulbs, when operated intermittently and at a greater voltage than the manufacturer specified, lasted from 300 to 350 hours of total operating time of the projector and for even a longer period.

Because the lamp housing in my projector is so located that it is in contact with the outer air, very good heat radiation is secured. Due to the design of the lamp housing a strong natural draft is continually flowing past the lamp. Cooling, therefore, is accomplished both by radiation and natural draft.

As I have noted above, an important feature resulting from the employment by me of the induction motor with worm gear and the train of gears specified in an illustrative way permits of substantially noiseless operation, a feature which permits the employment of this invention for advertising purposes in stores and shops and other places where any apparatus giving off grinding or clicking noises would be objectionable.

Another feature of that form of the apparatus employing natural draft for ventilating purposes is to secure a ratio between length of the filament of the electric lamp and the height of the stack or convection column to obtain cooling adequate to cope with the heat evolution. Since the employment of the usual metal filament involves the evolution of heat very largely in proportion to its length and corresponding light emission, I find a simple relationship between length of filament and stack height may be established which permits of satisfactory ventilation and cooling. Ordinarily I do not wish to employ stack height less than four times the length of the filament, thus giving the ratio 1:4, while the ratio 1:6 is even better and in some cases I may employ 1:10 or even higher ratios.

Thus the invention consists of an illuminated-image projector comprising, for example, an incandescent electric light source of illumination coordinated with an image-receiving screen; a sequence of image transparencies, as for example in film form, capable of moving between the source of light and screen, whereby the image of the particular transparency on the film at that moment is projected on said screen, means for substantially noiselessly advancing said film, as for example, by means of an electrical induction motor, such movement being in a predetermined manner between light and screen, the image being maintained in position between said light and screen for a definite interval of time; means for extinguishing the light substantially during the period of motion of said film; and a flue for providing natural draft ventilation of the light chamber and film chamber, the height of said flue above the filament of the lamp being at least four times the length of the lamp filament.

In addition to the above I may also in a second modification employ continuous lighting, in which case mechanical draft preferably is employed.

In the construction of the aforesaid projector preferably I arrange that a part of the housing which contains the lamp in a position such that the greater part of that chamber is exposed to the air and may be made of conducting metal which if painted black tends to radiate considerable heat directly into the air, a condition which may be augmented by metal vanes projecting from the exterior of the casing.

What I claim is:

1. In an illuminated image projector including a light source of illumination for illuminating a series of image transparencies and operating mechanism for advancing said image transparencies past said light source, a casing enclosing substantially all of the operating mechanism, said casing being provided with an inlet through which air may enter the casing and with an outlet through which air from the casing may pass, an elongated flue carried on and within said casing, one end of the flue connecting with the outlet of the casing, a light chamber positioned within said casing, means permitting air entering said casing to pass into said light chamber, and means directing air passing from said light chamber into the elongated flue, whereby heat generated during operation of the light is dissipated by the air circulating through the light chamber and elongated flue.

2. In an illuminated image projector including a light source of illumination for illuminating in seriatim a series of image transparencies in heat disintegrable film form and operating mechanism for advancing said film past said light source, a casing enclosing substantially all of the operating mechanism, said casing being provided with an inlet through which air may enter the casing and with an outlet through which air from the casing may pass, an elongated flue carried on and within said casing, one end of the flue connecting with the outlet of the casing, a film chamber positioned within said casing, means permitting air entering said casing to pass into said film chamber, and means directing air passing from said film chamber into the elongated flue, whereby heat generated during operation of the light is dissipated by the air circulating through the film chamber and elongated flue.

3. In an illuminated image projector including a light source of illumination for illuminating in seriatim a series of image transparencies in heat disintegrable film form and operating mechanism for intermittently advancing said film past said light source, a casing enclosing substantially all of the operating mechanism, said casing being provided with an inlet through which air may enter the casing and with an outlet through which air from the casing may pass, an elongated flue carried on and within said casing, one end of the flue connecting with the outlet of the casing, a light chamber positioned within said casing, means permitting air entering said casing to pass into said light chamber, means directing air passing from said light chamber into the elongated flue, a film chamber positioned within said casing, means permitting air entering said casing to pass into said film chamber, and means directing air passing from said film chamber into the elongated flue, whereby heat generated during operation of the light is dissipated by the air circulating through the light and film chambers and elongated flue to avoid substantially heat deterioration of the heat disintegrable film.

CARLETON ELLIS, Jr.